United States Patent [19]

Lamy

[11] 4,056,945

[45] Nov. 8, 1977

[54] PROCESS AND DEVICE FOR LAYING SUBMARINE PIPELINES

[75] Inventor: Jacques Edouard Lamy, Fontenay-aux-Roses, France

[73] Assignee: Compagnie Generale pour les Developpements Operationnels des Richesses Sous-Marines "C.G. Doris", Paris, France

[21] Appl. No.: 741,622

[22] Filed: Nov. 15, 1976

Related U.S. Application Data

[63] Continuation-in-part of Ser. No. 685,738, May 13, 1976.

[30] Foreign Application Priority Data

July 1, 1976 France .................................. 76.20080

[51] Int. Cl.² .............................................. F16L 1/00
[52] U.S. Cl. ...................................... 61/107; 61/110; 61/111; 61/112; 114/253
[58] Field of Search ................. 61/107, 110, 111, 112, 61/113, 105; 254/173; 114/244, 245, 253

[56] References Cited

U.S. PATENT DOCUMENTS

| 3,133,421 | 5/1964 | Lamy et al. | 61/107 |
| 3,849,997 | 11/1974 | Gower | 61/113 |

FOREIGN PATENT DOCUMENTS

| 1,222,669 | 1/1960 | France | 6/112 |

Primary Examiner—Jacob Shapiro
Attorney, Agent, or Firm—Laurence R. Brown

[57] ABSTRACT

For laying a submarine pipeline, hauling of the same is exerted by means of a force distribution cable which extends over the full length of the submerged part of the pipeline and which is attached to it by hangers, preferably in conjunction with heavy chains acting as guide ropes and anchoring blocks. A further cable attached to the head of the pipeline transmits directly thereto a part of the haulage force.

6 Claims, 2 Drawing Figures

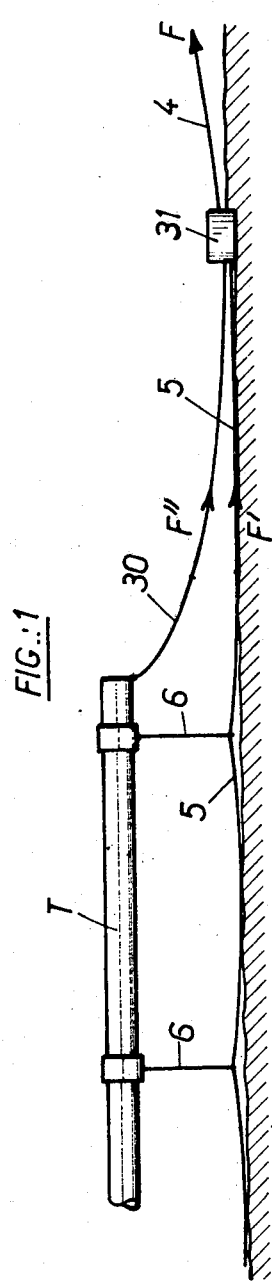
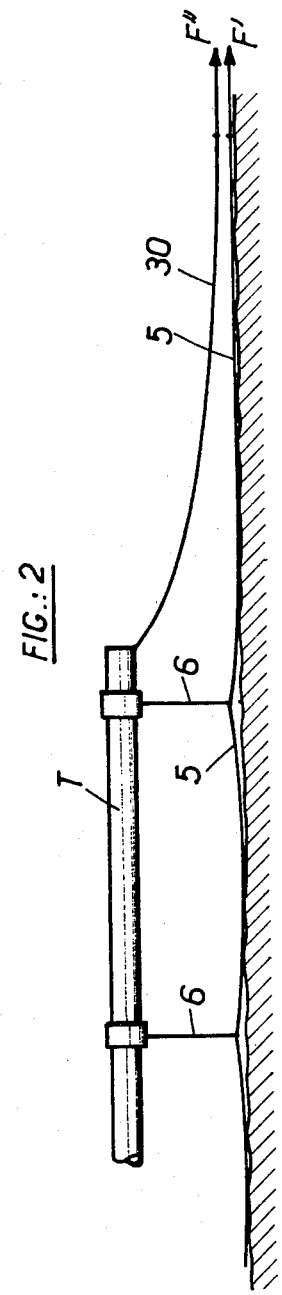

PROCESS AND DEVICE FOR LAYING SUBMARINE PIPELINES

This is a Continuation-in-Part of my co-pending Patent Application Ser. No. 685,738 filed on May 13, 1976.

The present invention relates to the laying of submerged pipelines such as submarine pipelines, which are provided for instance for transporting liquid or gazeous hydrocarbons.

The invention described in my above mentioned Patent Application is an improvement in a known process for laying submarine pipelines, which consists in hauling step by step, from the shore seawards, a part of a pipeline of a gradually increasing length; this part is made of a series of sections which are successively added together at the rear end, still on the strand, of the already submerged pipeline length.

Each section is itself obtained by the assembly of a rather large number of unitary tubes of short length (for example of the order of 12 or 24 meters) which are welded end to end together. Such a section may have then an appreciable length (of the order of 1 km or even more) without any other limit than the availability of a sufficient space for prefabricating and storing pipelines in the vicinity of the shore. The sections are prefabricated ashore, for instance during winter, when bad weather does not allow a working at sea and they are launched when meteorological conditions are propitious.

For the laying of pipelines, each new section is welded to the rear end of the already submerged pipeline part which still rests on the shore. The assembly made of this part and the new section is then hauled seawards over a distance, which is equal to that of a section, by means of hauling contrivances carried by floating devices. Hauling is then suspended, the following section is welded and this operation is repeated as many times as sections are to be added and laid.

In its broadest definition, the process according to the invention described in my above mentioned Patent Application consists in distributing the total traction force, which is necessary for advancing the pipeline part to be hauled, by means of a force distribution cable which extends over the full length of this pipeline part and which is attached to the latter at a plurality of points spaced along said pipeline part.

In this way the tensile force applied to the pipeline at every attachment point of the distribution cable is substantially equal to the quotient of the total traction force transmitted by the cable, divided by the number of attachment points.

As the tensile stresses in the pipeline are reduced by the same ratio, the much more economical use of traditional unitary tubes (of "rolled-welded" type, in ordinary steel) may still be contemplated, even for establishing long and heavily weighted, submarine pipelines.

The invention described in my above mentioned Patent Application also includes a device for putting the above mentioned process into practice, which may be used for laying a pipeline which has in itself or in association with floating means a positive buoyancy. This device comprises according to the invention a force distribution cable which extends under the pipeline part to be hauled all along the latter and a plurality of hangers, spaced along said pipeline part, by means of which this pipeline part and the distribution cable are interconnected, the overall system "pipeline-cable-hangers" having in itself or in association with weighting means a slightly negative buoyancy.

These weighting elements may comprise weighty elements, which are fixed at places to the distribution cable, or also guideropes, such as heavy chains, which are fixed to the pipeline or the hangers or partially confounded with the latter, each of them dragging partly on the seabed.

The present invention relates to an improvement in the method and apparatus defined above wherein use is made of a force distribution cable extending over the length of the portion of pipeline to be hauled and attached thereto at a plurality of positions distributed therealong.

This improvement consists in distributing the towing force between the distribution cable trailing on the bottom and the pipeline, by means of a portion of cable attached to the head of the pipeline and receiving directly a part of the traction force exerted by the tug.

One can succeed in this way in dividing the towing force between the pipeline and the trailing cable while maintaining substantially equal elastic extensions in the two objects.

The following description with reference to the attached drawing, given by way of a non-limiting example, will enable the method of carrying the invention into effect to be understood.

In the drawings:

FIGS. 1 and 2 show schematically in elevation part of the head of a pipeline in the course of being towed and provided with the improvement according to the invention.

In the figures the reference letter T designates part of the head of a pipeline section in the process of being laid by towing from a tug not shown. This pipeline has itself or in association with floating means (not shown) a positive buoyancy. To this end spaced or continuous (extending over all the pipeline length) floats are used, which are filled with a gaseous or liquid fluid, having a specific weight less than water (atmospheric or pressurized air, hydrocarbon, ammoniac or liquid carbonic dioxide, fluidized compound made of a suspension of plastic microballs in water, etc.). Said floats may be releasable or filled with water at the end of the operations for laying the pipeline. The floating means are associated with weighting means that will be described further on.

The pipeline may comprise in fact either one single useful tube or a system of useful, parallel tubes, integral with each other.

A distribution cable 5, disposed as an extension of the haulage cable which is attached to the tug or haulage winch, extends over the whole length of the section of pipeline to be towed and is attached thereto at a plurality of positions distributed along the pipeline by means of spaced suspenders 6. The weight of the cable 5 and the suspenders 6, formed in any convenient manner, is such that the lifting force of the pipeline is in equilibrium with its weight so that the cable 5 rests and trails on the bottom while maintaining the pipeline at a certain height above the bottom.

In the embodiment of the invention shown in FIG. 1, another portion of cable 30 is attached to the head of the pipeline for transmitting directly to the latter a part of the haulage force exerted by the cable 4. To this effect, this portion of cable 30 is connected to the cable 5 at a certain distance in front of the head of the pipeline so as to divide the haulage force F exerted by the tug on the cable 4 into two forces F' and F" applied to the cable 5 and the pipeline respectively.

One can in this way ensure that the elastic extensions of the cable 5 and the pipeline are substantially the same whereas if one hauls on the cable alone, the latter assumes an extension capable of causing difficulties in the operation of the suspenders 6. This difficulty could be avoided by using suspenders of increasing length towards the head of the pipeline to compensate for the displacements of the points of attachment of the suspenders to the cable 5, but this arrangement would be complicated.

The division of the force F between the cable 5 and the cable 30 should be made as a function of the moduli of elasticity of the cable 5 and the pipeline, the division being equal if these moduli are equal. For example, if the cable 5 is formed of parallel steel wires and has a modulus of elasticity substantially equal to that of a steel pipeline, a twisted cable having like steel wires will have a modulus of the order of a half.

An interesting solution consists in attaching the cables 5 and 30 to a weight 31 sufficiently heavy to rest on the bottom and harnessed to the haulage cable 4. This arrangement also has the advantage that the weight 31, in sliding on the bottom, prepares a path for the trailing cable 5.

Alternatively, as shown in FIG. 2, one need not connect together the cables 5 and 30 but form them part of two independent haulage winches provided on the tug or at the haulage station, which will enable the distribution of the forces F' and F" between the two cables to be regulated.

It is to be understood that the embodiments described are only examples and it would be possible to modify them, particularly by the substitution of technical equivalents, without departing from the scope of the invention.

I claim:

1. A method of laying a pipeline on the bed of a body of water while forming the pipeline with a plurality of pipe sections initially stored ashore, comprising the steps of advancing a first one of said pipe sections towards the body of water, connecting a forward end of a second one of said pipe sections to a rear end of said first pipe section, further advancing said first and second pipe sections towards the water body connecting a forward end of a third one of said pipe sections to a rear end of said second pipe sections, and so on, each advancing step comprising hauling a pipeline portion of substantial length towards the body of water, wherein each advancing step comprises applying a traction force to a forward end of said first pipe section, and applying a plurality of further traction forces to a plurality of points spaced along said pipeline portion.

2. A device for laying a pipeline on the bed of a body of water while forming the pipeline with a plurality of pipe sections initially stored ashore, comprising means for advancing towards the body of water a pipeline portion of substantial length, the advancing means comprising a hauling cable attached to a forward end of the pipeline portion, a force distribution cable extending over the full length of the pipeline portion, means attaching the force distribution cable to a plurality of points spaced along the pipeline portion, means applying a first traction force to the hauling cable, and means applying a second traction force to the force distribution cable.

3. A device as claimed in claim 2, wherein the ratio of the first traction force to the second traction force is equal to the ratio of the modulus of elasticity of the hauling cable to the modulus of elasticity of the pipeline portion.

4. A device as claimed in claim 2, comprising means connecting the force distribution cable to the hauling cable at a distance ahead of said forward end of the pipeline portion.

5. A device as claimed in claim 4, wherein said cable connecting means comprise a weight trailing on the bed of the body of water.

6. A device as claimed in claim 2, comprising means connecting the hauling cable and the force distribution cable to respective hauling winches.

* * * * *